Figure 1:
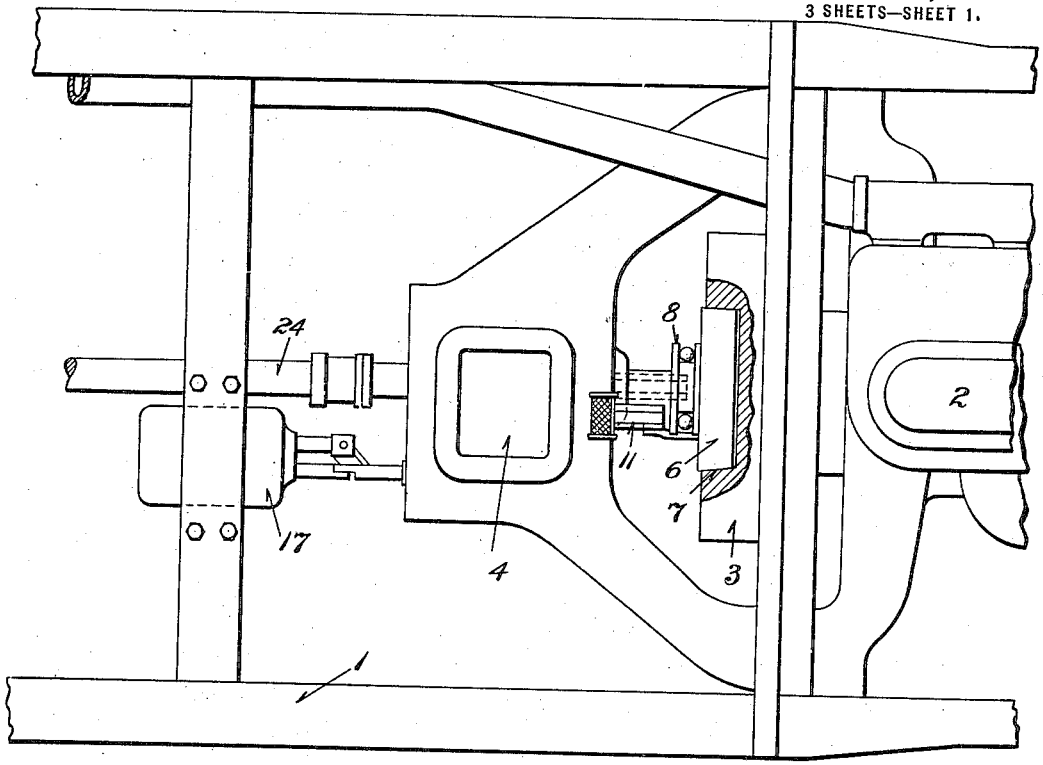

J. E. WEBSTER.
GEAR SHIFTING MECHANISM.
APPLICATION FILED MAR. 3, 1914. RENEWED JUNE 13, 1918.

1,363,629.

Patented Dec. 28, 1920.
3 SHEETS—SHEET 1.

WITNESSES:
Stephen Wach
J. R. Langley

INVENTOR
John E. Webster
BY
Wesley G. Carr
ATTORNEY

J. E. WEBSTER.
GEAR SHIFTING MECHANISM.
APPLICATION FILED MAR. 3, 1914. RENEWED JUNE 13, 1918.

1,363,629.

Patented Dec. 28, 1920.
3 SHEETS—SHEET 2.

WITNESSES:
Stephen Wach.
J. R. Langley.

INVENTOR
John E. Webster
BY
Wesley G. Carr
ATTORNEY

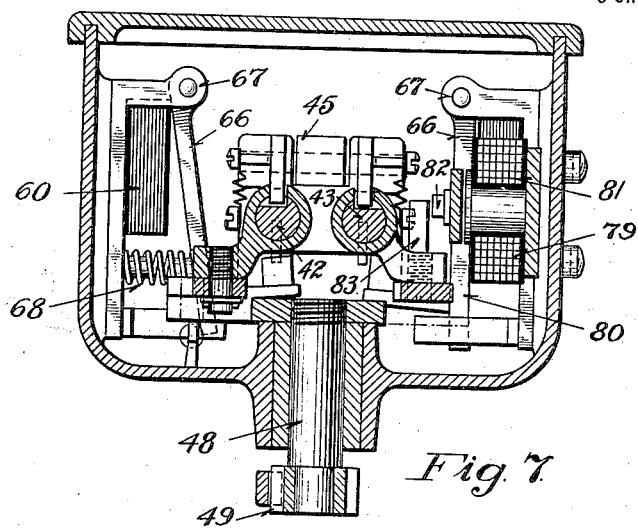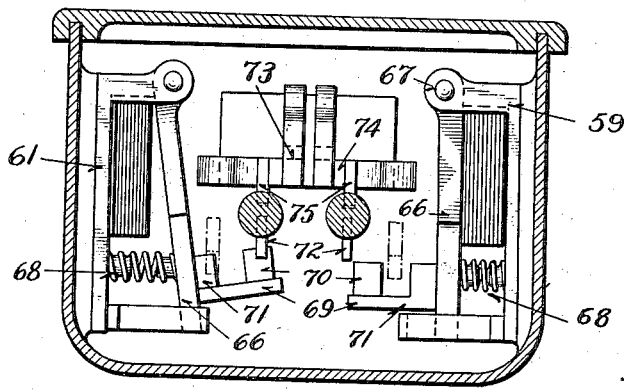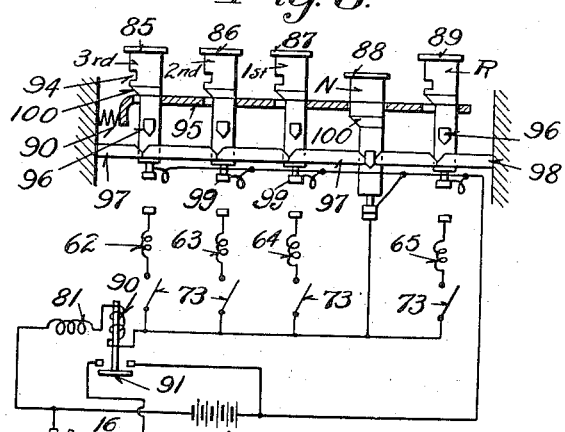

UNITED STATES PATENT OFFICE.

JOHN E. WEBSTER, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,363,629.   Specification of Letters Patent.   Patented Dec. 28, 1920.

Application filed March 3, 1914, Serial No. 822,173. Renewed June 13, 1918. Serial No. 239,910.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Gear-Shifting Mechanism, of which the following is a specification.

My invention relates to gear shifting mechanisms for automobiles or other motor vehicles, and particularly to such mechanisms as are controlled by selective devices.

My invention has for its object to provide a device of the character above indicated by means of which the transmission gear mechanism of a motor vehicle may be controlled by the operation of the usual clutch pedal or lever.

A second object of my invention is to provide an arrangement for operating the gear shifting mechanism by a power device upon the actuation of any one of several push buttons which correspond to the various speeds.

In the operation of motor vehicles, it is the usual practice to accomplish the changes in speed ratio by means of a manually operable lever which is connected to shiftable gear wheels. It is highly desirable that the changes in speed ratio be accomplished without the application of considerable physical force in order that the attention of the operator may not be diverted from the steering of the vehicle.

In my copending application, Serial No. 810,814, filed January 7, 1914, I have provided a mechanism which selectively controls the actuation of the shiftable gear wheels by the usual clutch pedal. This arrangement, while enabling the operator to accomplish the changes in speed ratio without releasing the steering wheel, requires the application of considerable physical force.

In the present invention, I provide a structure in which the changes in speed ratio are selected in advance of the actual change, by the actuation of one of several push buttons. The clutch pedal then controls a circuit which includes an electromagnet for actuating the gear shifting mechanism to produce the desired change in speed ratio. The circuit of the electromagnet is closed only upon the actuation of the clutch pedal beyond the point at which the clutch is disengaged.

Figure 2:
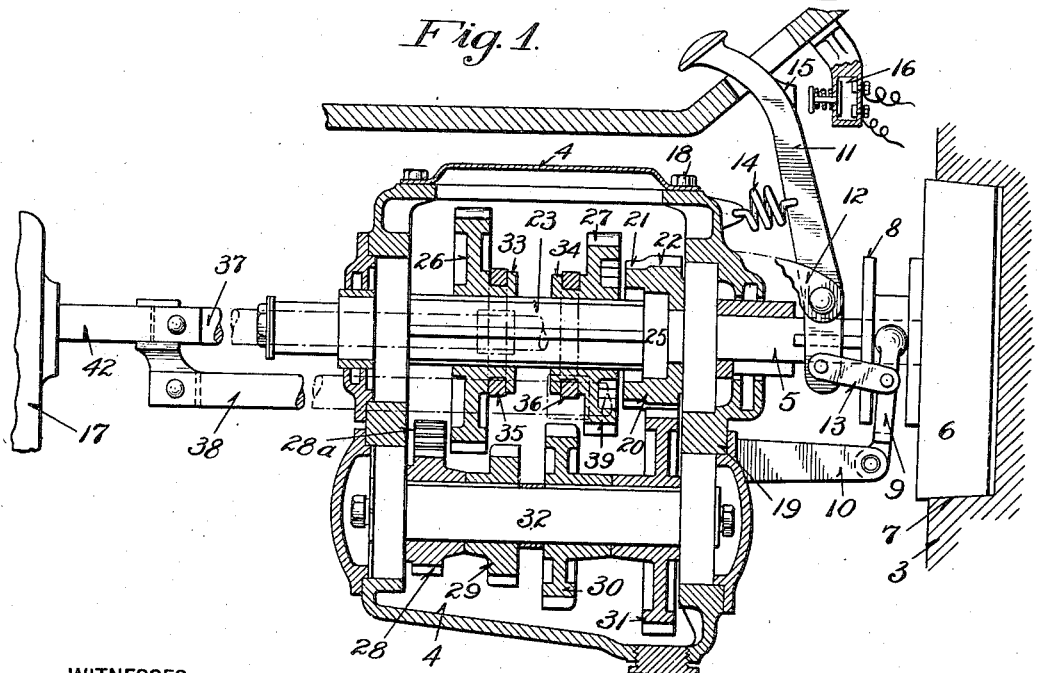
Figure 3:
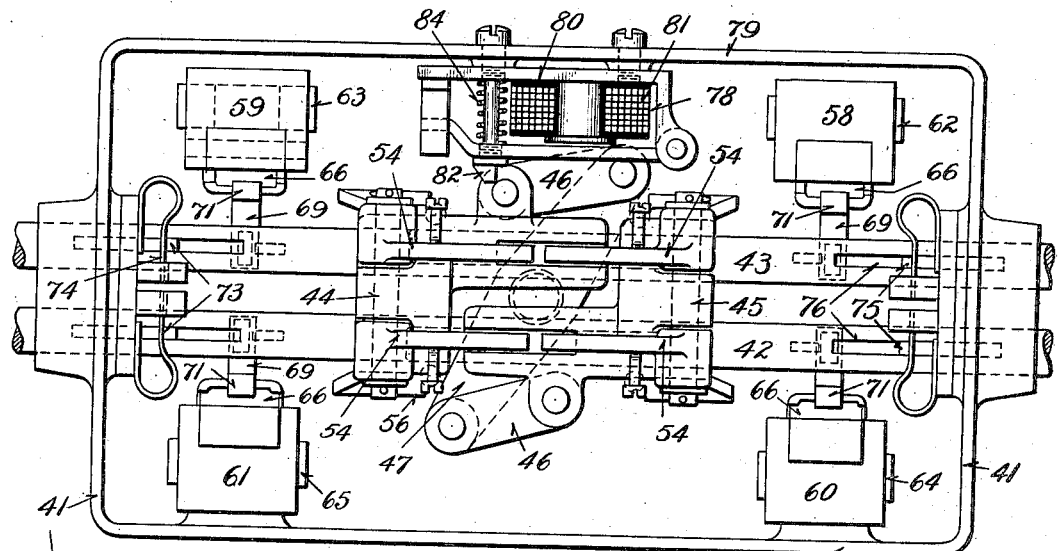
Figure 4:
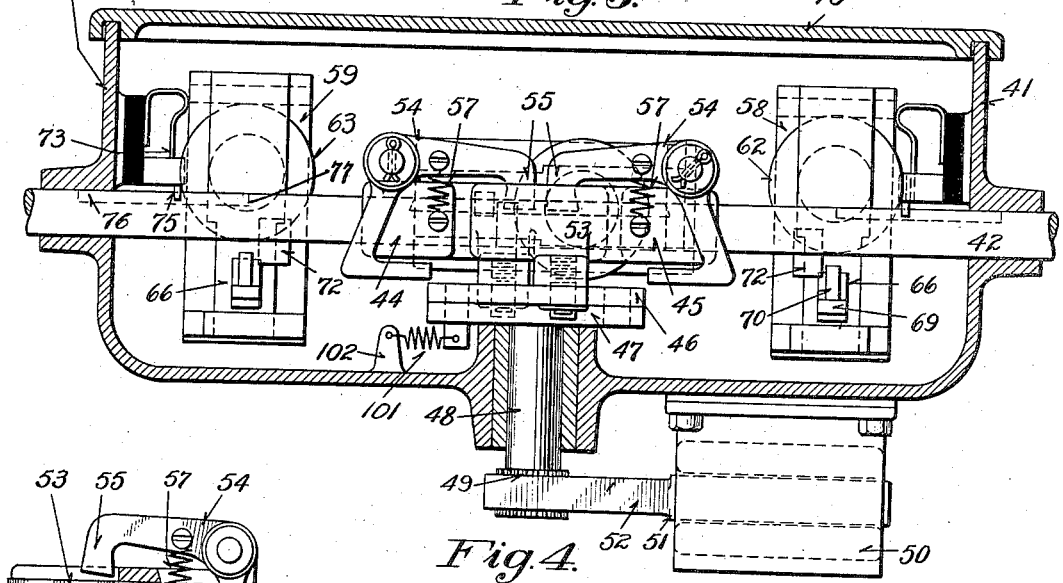
Figure 5:
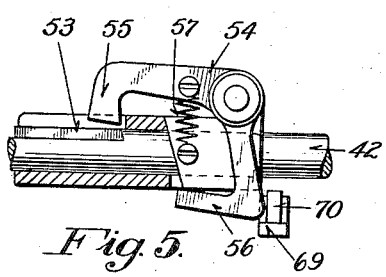
Figure 6:
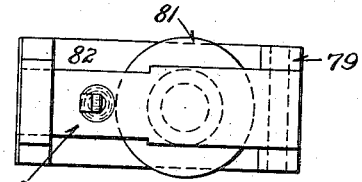

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a plan view of the gear-shifting mechanism. Fig. 4 is a view, in longitudinal section, of the mechanism of Fig. 3. Figs. 5 and 6 are views of details. Figs. 7 and 8 are sectional views of the mechanism of Fig. 3. Fig. 9 is a diagrammatic view of the electrical circuits employed in connection with my invention and of the mechanism for controlling a set of push buttons that control the circuits.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 formed in the fly wheel 3. The clutch member 6 is provided with an integral grooved collar 8 to be engaged by a yoke member 9 that has a pivotal support upon a bracket 10. A pedal 11, that is adapted to be operated by the foot of the operator, has a pivotal support upon a lug 12 and is connected by a link 13 to the yoke member 9. A spring 14, that is attached at one end to a suitable stationary part, normally retains the clutch pedal 11 in its rearward position, with the clutch member 6 engaging the clutch member 7 in the fly wheel 3. The clutch pedal 11 is provided with a shoulder portion 15 that operates to close a switch 16 when the clutch pedal has been depressed beyond the clutch disengaging position. The switch 16 controls the actuation of a gear-shifting mechanism indicated at 17.

The transmission mechanism 4 forms no part of my invention but is so combined therewith that a description thereof is desirable in order to explain the operation of the gear-shifting mechanism. The shaft 5, which is connected to the clutch member 6, extends into the transmission casing 18 through an end wall 19 and has a bearing therein. A gear wheel 20, having two sets of gear teeth 21 and 22, is mounted upon the shaft 5 within the casing 18. A transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31 that are fixed upon a counter shaft 32 and an idler gear wheel 28$^a$ that is in mesh with the gear wheel 28.

The gear wheel 31 is always in mesh with the gear teeth 22 to establish a fixed speed ratio between the shafts 5 and 32. The mechanism is arranged to provide three speeds in the forward and one in the reverse direction. The changes in speed ratio are controlled by the slidable gear wheels 26 and 27 which are respectively provided with integral grooved collars 33 and 34 to be engaged by yoke members 35 and 36. The yoke members 35 and 36 are respectively fixed upon shift rods 37 and 38 that are controlled by the gear shifting mechanism, as will be later described.

When the gear wheel 26 is in mesh with the gear wheel 29, the mechanism is in its first or low-speed position and the shaft 5 is connected through the gear teeth 22, gear wheel 31, counter shaft 32 and gear wheels 29 and 26 to the transmission shaft 23. For the second or intermediate speed, the gear wheel 27 is shifted into mesh with the gear wheel 30. For the third or high speed, the gear wheel 27 is shifted to the right until internal gear teeth 39, with which the gear wheel 27 is provided, mesh with the gear teeth 21. The shaft 5 is then directly connected to the transmission shaft 23 and the latter is driven at engine speed. For driving in the reverse direction, the gear wheel 26 is shifted into mesh with the idler gear wheel 28$^a$, which is always in mesh with the gear wheel 28. The transmission mechanism is illustrated in its neutral or inoperative position in which the shaft 23 is not connected to the counter shaft 32.

Referring now to Figs. 3 to 8, inclusive, the gear shifting mechanism 17 comprises a housing or casing 40 having end walls 41 which provide bearings for two shift rods 42 and 43. The shift rods 42 and 43, which are slidable axially in their bearings, are respectively connected to the shift rods 37 and 38 of the transmission mechanism. Two blocks 44 and 45 are slidably mounted upon the shift rods 42 and 43. The blocks 44 and 45 are connected by links 46 to the oppositely extending arms of a lever 47. The oscillation of the lever 47 operates to slide the blocks 44 and 45 in opposite directions simultaneously. The lever 47 is fixed upon a rock shaft 48 that is provided with a pinion 49. An electromagnet 50, which is attached to the casing 40, comprises a movable core member 51. A rack 52, which coacts with the pinion 49, is integral with the core member 51.

Each of the shift rods 42 and 43 is provided with a longitudinal groove 53. Four dogs 54, that are pivotally mounted on opposite sides of the blocks 44 and 45, are each provided at one end with a hook portion 55 for engaging the respective shift rods 42 and 43. Each of the dogs 54 is provided, at its opposite end, with a horizontally extending portion 56. Normally, the dogs 54 are retained by springs 57 in the positions shown in Fig. 4, with the hook portions 55 resting upon the bottoms of the grooves 53.

Four electromagnets 58, 59, 60 and 61 of the clapper type, are attached to the side walls of the housing 40, each of the electromagnets being adjacent to one of the corners of the housing. The electromagnets comprise coils 62, 63, 64 and 65, respectively. Each electromagnet comprises, also, an armature 66 having a pivotal support indicated at 67 and being normally held outward by a spring 68. Each armature 66 is provided, upon its outer face, with a stop 69 of substantially U-shape. When the electromagnets are deënergized, the vertical portions 71 of the corresponding stops 69 are in the paths of movement of the horizontally extending portion 56 of the coacting dogs 54, and the vertical portions 70 of the said stops are in the paths of movement of coacting lugs 72.

The lugs 72, which are four in number, are located on the under sides of the shift rods 42 and 43, there being one lug on each rod upon each side of the blocks 44 and 45. When the blocks 44 and 45 are moved outwardly, and the dogs 54 are engaged by the respective stops 69, the dogs 54 are rocked on their pivots and the hook portions 55 are raised upwardly from the grooves 53, (Fig. 5,) so that they cannot engage the corresponding shift rods. When one of the lugs 72 engages the corresponding stop 69, further movement in that direction is prevented.

When the electromagnets are energized, the armatures are drawn inwardly and the stops 69 do not obstruct the outward movements of the several dogs 54 and the lugs 72. The dogs 54 then pass between the vertical portions 70 and 71 of the stops 69, the horizontal portions 56 of the dogs being of sufficient length to retain the armatures in this position until the dogs 54 are withdrawn. In the operation of the mechanism, which is later described, it is possible to energize only one of the electromagnets at one time. Consequently, if one of the electromagnets be energized, all of the dogs 54, except that one corresponding to the energized electromagnet will be rocked on their pivots to prevent their engagement with the corresponding shift rods. The hook portion 55 of the dog 54 that is not engaged by a stop 69 engages the shift rod 42 or 43, as the case may be, and a further movement of the sliding blocks 44 and 45 will cause a corresponding movement of the shift rod and of the one or the other of the slidable gear wheels 26 and 27 in the same direction. Each of four self-closing limit switches 73, which are mounted in pairs in each end of the casing 40, comprises a movable member 74 having a pin 75 to project into a groove 76 in the rod 42 or the rod 43, as the case may be. The pin 75 is actuated by a coacting shoulder portion 77 to open its corresponding limit switch when the shift rod has reached the limit of its endwise movement. Each limit switch 73 controls the circuit of one of the electromagnets, the arrangement being such that the circuit of the electromagnet that has been energized to cause the shifting of one of the rods 42 and 43, when the blocks 44 and 45 are actuated in opposite directions, is always broken by the corresponding limit switch that is open at the end of the movement of the said rod which causes meshing of the transmission gear wheels.

The movement of the pedal 11 beyond its clutch-disengaging position, and the consequent actuation of the block members 44 and 45 to return the shifted gear wheel to its neutral position, is controlled by an electromagnet 78 that is attached to a side wall 79 of the housing 40. The electromagnet 78 is provided with a pivotally mounted armature 80 and a winding 81. The armature 80 is provided with a stop member 82 to coact with a pin 83 that is fixed to the block member 44. When the coil 81 is deënergized, a spring 84 holds the armature 80 in its outer position, with the stop member 82 in engagement with the pin 83. When the coil 81 is energized, the armature 80 is drawn inwardly against the pressure of the spring 84 to withdraw the stop member 82 from the path of movement of the pin 83. The clutch pedal may then be moved freely to actuate the block members 44 and 45 to shift the gear wheels, as desired.

The electrical circuits for controlling the gear shifting mechanism are illustrated in Fig. 9. The electrical connections comprise five parallel circuits that are respectively controlled by push buttons 85, 86, 87, 88 and 89. The several push buttons are designated according to the speed ratio controlled by 3rd, 2nd, 1st, N (neutral) and R (reverse), respectively. The several push buttons are so interlocked that only one button can close its corresponding circuit at one time, and this one remains closed until it is released by the actuation of another button. The button 88, or neutral button, is arranged to open as soon as released after actuation. The magnet coils 62, 63, 64 and 65 are in series with the push buttons 85, 86, 87 and 89, respectively, and with the corresponding limit switches 73. The coil 81 of the electromagnet 78 and the coil 90 of an electromagnetic switch 91 are in series with each of the parallel circuits and with a battery 92. The switches 91 and 16, the latter of which is actuated by the clutch pedal 11, control a circuit comprising the coil 93 of the magnet 50 and the battery 92.

The means employed to interlock the push buttons forms no part of my invention, but a brief description of the same is desirable in order to explain the operation of my invention. Each push button, except the neutral button 88, is provided with a notch 94 to be engaged by a spring pressed slidable member 95 when the button has been sufficiently depressed. The several push buttons are provided with lugs 96 that are wedge-shaped at one end for insertion between the ends of bars 97 that are slidably mounted between stationary members 98. The distance between the stationary members 98 is equal to the sum of the lengths of the several bars 97 and the width of one of the lugs 96, thereby insuring that only one of the push buttons may be depressed at one time. When one of the buttons is depressed, the lug 96 is inserted between the ends of the corresponding bars 97 and the notch 94 is engaged by the member 95 to lock it in its depressed position, with the corresponding contact members 99 engaged to close one of the parallel circuits. When it is desired to close a second circuit, the corresponding button is depressed, and the member 95 is engaged by the inclined surface 100 and thereby shifted to the left, as shown, to release the first button before the lug 96 of the second button has engaged the bars 97. The neutral button 88, which is not provided with a groove, operates to release any other button which may have been locked in its depressed position.

It may be assumed that the transmission gear mechanism is in its neutral position, as illustrated in Fig. 2, and that the gear shifting mechanism is in its corresponding normal or neutral position, as shown in Figs. 3 and 4. It may be assumed, also, that the engine has been started and that the engine clutch members 6 and 7 are disengaged. It is desirable to start the vehicle on first speed, and the push button 87 is accordingly pressed to close a circuit from the battery through the push button 87, coil 64 of the electromagnet 60, limit switch 73 and coils 90 and 81 to the battery. The coil 64 is energized to draw the armature 66 of the electromagnet 60 inwardly so that it cannot obstruct the movement of the corresponding dog 54 and lug 72. The coil 81 of the electromagnet 78 is also energized to draw the armature 80 inwardly to cause the stop member 82 to release the pin. The coil 90 is energized to close the switch 91 to render the circuit in which it is included controllable by the switch 16. The clutch pedal 11, which, at the time of starting the engine, is in such a position that the engine clutch members 6 and 7 are out of engagement, is then pressed forwardly beyond the clutch-disengaging position to close the switch 16.

The closing of the switch 16 completes a circuit through the coil 93 of the electromagnet 50 and the coil 93 is thereby energized to draw the core member 15 and the rack 52 inwardly. The pinion 49 then rotates the rock shaft 48, and the lever 47 is thus operated to actuate the blocks 44 and 45 outwardly, the hook portions 55 of the dogs 54 sliding along the grooves 53. When the hook portions 55 approach the ends of the grooves, the dogs 54, with the exception of that one coacting with the electromagnet 60, engage the corresponding stops 69, and the dogs 54 are rocked about their pivots to raise the hook portions 55 from the grooves 53. Further movement of the blocks causes the dog 54 that is not rocked to engage the rod 42 and move it to the right (Figs. 3 and 4) to mesh the gear wheel 26 with the gear wheel 29.

When the gear wheels 26 and 29 are fully meshed, the shoulder portion 77 and the pin 75 will have opened the corresponding limit switch 73 to break the circuit comprising the coils 64, 90 and 81. The operator then allows the spring 14 to retract the clutch pedal 11. A spring 101, that is attached at one end to a stationary lug 102 and at the other end to the lever 47, returns the blocks 44 and 45, the rock shaft 48 and the rack 52 to their respective normal positions. The several dogs 54 are thus returned to their respective normal positions, the springs 57 drawing the dogs 54 downwardly as soon as the hook portions 55 have passed the ends of the grooves 53. The engine clutch is still out when the various parts are in their respective normal or neutral positions. Further return movement of the clutch pedal will effect the engagement of the engine clutch and the vehicle will be driven through the connections above described.

The circuit controlled by the push button 87 will remain open until another button has been pressed and the gears shifted from the first-speed position. The limit switch 73 will remain open until the shift rod 42 has been returned to withdraw the shoulder 77 from engagement with the pin 75. The coils 81 and 90 cannot be energized until a push button other than button 87 is pressed. It is, therefore, impossible to actuate the lever 47 of the shifting mechanism by means of the clutch pedal 11 before a second button has been actuated. The clutch can be controlled as desired without in any way affecting the transmission gear mechanism because the electromagnet 50 cannot be operated until the switches 91 and 16 have been closed.

It will be evident that the safety device comprising the electromagnet 78 and the stop member 82 may be omitted if desired because the actuation of the switch 16 by the pedal 11 has no effect when the electromagnetic switch 91 is open, the latter forming a safety device which is sufficient for all ordinary purposes. If the electromagnet 82 and its related parts be retained, the switch 91 may be omitted, as the circuit comprising the coil 93 may be controlled by the switch 16.

When it is desired to change the speed ratio, as, for example, to second speed, the push button 86 may be pressed at any time desired in advance of the actual change. The coil 63 of the electromagnet 59 and the coils 81 and 90 will be energized to perform the same functions as described in connection with the corresponding parts when the push button 87 was closed. To effect the change to the desired speed, the operator presses the pedal 11 to disengage the engine clutch. The rod 42 is in its shifted position and the left end of the groove 53 is near the coacting hook portion 55 of the adjacent dog 54, so that a slight outward movement of the latter member will cause these parts to engage. The further actuation of the pedal 11 after the clutch is out effects the closing of switch 16 and the electromagnet 50 first operates to shift the rod 42 to its neutral position. At this point, all of the dogs 54, except that one controlled by the electromagnet 59, have engaged their corresponding coacting stops 69, and the dogs 54 are rocked out of engagement with the respective shift rods 42 and 43. But, since the coil 63 of the electromagnet 59 is energized, the coacting dog 54 is still in operative position, and the further movement of the clutch pedal 11 causes the rod 43 to be shifted to the left, and the gear wheel 27 to be shifted into mesh with the gear wheel 30. The coacting limit switch 73 will then be opened and the coils 63, 81 and 90 deënergized. The deënergization of the coil 93, caused by the opening of the switch 91, first causes the blocks 44 and 45 and the dogs 54 to be returned to their respective normal positions by the spring 101, whereupon the stop member 82 again engages the pin 83. The return movement of the pedal 11 by the spring 14 effects the engagement of the engine clutch, and the vehicle will be driven at second speed. In the same manner, changes may be made to third speed or the direction of drive reversed by actuating the appropriate push buttons 85 and 89, respectively. It will, of course, be understood that, in order to reverse the direction of the vehicle, it is necessary to bring it to a stop before the clutch is thrown in.

When it is desired to return either of the shiftable gear wheels 26 and 27 to the neutral position, the neutral button 88 is closed to energize the coils 81 and 90. This action may occur regardless of the closure of any of the speed-controlling buttons 85, 86, 87 and 89. The clutch is disengaged as before, whereupon the lever 47 is actuated by the rock shaft 48 to shift the blocks 44 and 45 outwardly. The shifted rod is in a position to be engaged immediately by the appropriate dog 54 to return it to its normal or neutral position. When the dogs 54 reach the stops 69, all of the dogs 54 are rocked out of the grooves 53, since none of the controlling electromagnets 58, 59, 60 and 61 are energized. It is then impossible to shift the gear wheels until one of the buttons, other than the neutral button 80, is closed.

It will be noted that I have provided a mechanism which requires for its operation, only the application of such physical force as is necessary to actuate the usual clutch pedal against the tension of an opposing spring. The operation is accomplished by a quick positive action of a powerful electromagnet, with substantially no possibility of damage to the gear wheels of the transmission mechanism. A single magnet is employed instead of a separate magnet for each speed ratio of the transmission mechanism. The employment of the electromagnetic switch to control the circuit of the operating electromagnet renders the use of a safety device unnecessary.

I claim as my invention:

1. In a gear-shifting mechanism, the combination with a shiftable member, an electromagnet comprising a movable member, and means for operatively connecting said movable member to said shiftable member, of means for selectively controlling said connecting means.

2. In a gear-shifting mechanism, the combination with a shiftable member, and a housing therefor, of an electromagnet attached to said housing, means comprising a rack and pinion for operatively connecting said electromagnet to said shiftable member, and means for selectively controlling said connecting means.

3. In a gear-shifting mechanism, the combination with a rod shiftable in opposite directions from a neutral position, of means for actuating said rod comprising an electromagnet for shifting said rod in either direction from its neutral position, and means comprising a plurality of push buttons, and a clutch pedal for controlling said electromagnet.

4. In a gear-shifting mechanism, the combination with a pair of members shiftable in opposite directions from a neutral position, an electromagnet comprising a movable member and means for operatively connecting said movable member to said shiftable members and means for selectively controlling said connecting means.

5. In a gear-shifting mechanism, the combination with a rod shiftable in opposite directions from a neutral position, an electromagnet comprising a movable member, and means for operatively connecting said movable member to said rod, of means for selectively controlling the connecting means to actuate said rod in either direction.

6. In a gear-shifting mechanism, the combination with a shiftable member, an electromagnet comprising a movable member, and means for operatively connecting said movable member to said shiftable member, of means comprising a plurality of push buttons for selectively controlling said connecting means.

7. In a gear-shifting mechanism, the combination with a shiftable member, a power device comprising a movable member, means comprising gear mechanism for operatively connecting said movable member to said shiftable member and means comprising a plurality of push buttons for selectively controlling said connecting means.

8. In a gear-shifting mechanism, the combination with a shiftable member and means comprising a power device for actuating said member, of means for controlling said power device, said means comprising a plurality of parallel circuits and push buttons for controlling the parallel circuits, and an electromagnetic switch having a coil in series with all of said parallel circuits.

9. In a gear-shifting mechanism, the combination with a shiftable member, an electromagnet comprising a movable member, and means for operatively connecting said movable member to said shiftable member, of means comprising a plurality of push buttons and a manually operable lever for selectively controlling said connecting means.

10. In a gear-shifting mechanism, the combination with a shiftable member and means comprising a power device for actuating said member, of means for controlling said power device, said means comprising a plurality of switches in parallel circuits, an electromagnetic switch having a coil in series with all of said parallel circuits, and a manually operable switch in circuit with said electromagnetic switch.

11. In a gear shifting device, the combination with a shiftable member, of an electromagnet for shifting said member in opposite directions from a neutral position, and means for selectively controlling the direction of said member.

In testimony whereof, I have hereunto subscribed my name this 27th day of Feb., 1914.

JOHN E. WEBSTER.

Witnesses:
A. B. KAIGHIN, Jr.,
B. B. HINES.